(12) United States Patent
Engineer

(10) Patent No.: US 11,156,148 B1
(45) Date of Patent: Oct. 26, 2021

(54) ACTIVE PRECHAMBER FOR USE IN AN INTERNAL COMBUSTION ENGINE

(71) Applicant: ARAMCO SERVICES COMPANY, Houston, TX (US)

(72) Inventor: Nayan Engineer, Canton, MI (US)

(73) Assignee: ARAMCO SERVICES COMPANY, Houston, TX (US)

( * ) Notice: Subject to any disclaimer, the term of this patent is extended or adjusted under 35 U.S.C. 154(b) by 0 days.

(21) Appl. No.: 17/183,859

(22) Filed: Feb. 24, 2021

(51) Int. Cl.
*F02B 19/12* (2006.01)
*F02B 19/10* (2006.01)

(52) U.S. Cl.
CPC .............. *F02B 19/12* (2013.01); *F02B 19/10* (2013.01)

(58) Field of Classification Search
CPC ................................ F02B 19/12; F02B 19/10
See application file for complete search history.

(56) References Cited

U.S. PATENT DOCUMENTS

| | | | |
|---|---|---|---|
| 2,459,286 A | 1/1949 | Rabezzana et al. | |
| RE29,978 E | 5/1979 | Leshner et al. | |
| 5,377,633 A | 1/1995 | Wakeman | |
| 6,536,405 B1 | 3/2003 | Rieger et al. | |
| 6,955,154 B1 | 10/2005 | Douglas | |
| 9,172,217 B2* | 10/2015 | Hampson | F02P 15/10 |
| 2004/0100179 A1* | 5/2004 | Boley | H01T 13/54 313/143 |
| 2012/0103302 A1 | 5/2012 | Attard | |
| 2012/0125287 A1* | 5/2012 | Chiera | H01T 13/32 123/254 |
| 2014/0261296 A1* | 9/2014 | Sotiropoulou | F02B 19/1014 123/260 |
| 2016/0053673 A1* | 2/2016 | Sotiropoulou | F02B 19/18 123/260 |
| 2020/0080466 A1* | 3/2020 | Anderson | F02B 19/08 |

* cited by examiner

*Primary Examiner* — Xiao En Mo
(74) *Attorney, Agent, or Firm* — Osha Bergman Watanabe & Burton LLP

(57) ABSTRACT

An active prechamber device may include a prechamber housing longitudinally aligned with a main axis. The active prechamber device may also include a prechamber nozzle forming a cap at an end of the prechamber housing. The prechamber nozzle and prechamber housing may define a prechamber space that extends along the main axis. The prechamber nozzle may have a plurality of orifices fluidly connected to the prechamber space. Additionally, a fuel injector may be in a linear arrangement with the prechamber housing along the main axis. The fuel injector may have a fuel injection nozzle positioned to spray a fuel into the prechamber space. An electrode arrangement may be formed within the prechamber space. The electrode arrangement may include an electrode shaft and an electrode ring. The electrode ring may circumscribe the electrode shaft to form a spark gap within the prechamber space.

20 Claims, 7 Drawing Sheets

ACTIVE PRECHAMBER FOR USE IN AN INTERNAL COMBUSTION ENGINE

BACKGROUND

Standard spark ignition engines use spark plugs to ignite an air-fuel mixture inside a main chamber. To improve fuel efficiency, it is desirable to run the engine with a lean mixture, i.e., where there is excess air for a given amount of fuel burnt. However, lean mixtures are more difficult to burn than stoichiometric mixtures. In some cases, standard spark plugs are unable to provide a strong enough discharge arc to burn a lean mixture, resulting in misfire or no-burn condition in the engine. Even in cases where the spark plug is able to ignite the lean mixture, the resulting flame may fail to propagate from the ignition site, resulting in no-burn condition in the engine.

One strategy that has been proposed for burning a lean mixture in a main chamber is turbulent jet ignition (TJI). In a TJI combustion system, a prechamber is used to combust a small quantity of fuel. The burn moves from the prechamber into the main chamber in the form of rich radicals that are hot and have high velocities to penetrate deep into the main chamber and ignite the lean mixture in the main chamber. The prechamber may be active or passive. Both types of prechambers have orifices through which the rich radicals exit the prechamber into the main chamber and through which the prechamber receives a charge from the main chamber. Both types of prechambers use spark plugs to initiate combustion of the charge in the prechamber. For the active prechamber only, fuel is directly injected into the prechamber using a fuel injector. As such, the charge that is combusted in an active prechamber may be richer in fuel content and provide more efficient burning of the lean mixture in the main chamber compared to the charge that is combusted in a passive prechamber.

One of the challenges of using an active prechamber in an internal combustion engine is integration of the active prechamber into the engine without significantly increasing the cost of manufacturing the engine. A typical approach to active prechamber integration in an engine includes forming an active prechamber assembly including a fuel injector, a spark plug, and a prechamber. The fuel injector and spark plug are arranged side by side in a housing whose width dictated by a combined width of the fuel injector and the spark plug. To limit the package size, the smallest spark plug is typically used, which limits the durability of the spark plug, leading to premature failures. Existing cylinder heads also have to be redesigned to accommodate the active prechamber assembly. Another approach to active prechamber integration in an engine involves building a dedicated cylinder head with dedicated pockets for the spark plug and the fuel injector and installing a prechamber appropriately in the cylinder head to result in an active prechamber.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an active prechamber device that may include a prechamber housing longitudinally aligned with a main axis. The active prechamber device may also include a prechamber nozzle forming a cap at an end of the prechamber housing. The prechamber nozzle and prechamber housing may define a prechamber space that extends along the main axis. The prechamber nozzle may have a plurality of orifices fluidly connected to the prechamber space. Additionally, a fuel injector may be in a linear arrangement with the prechamber housing along the main axis. The fuel injector may have a fuel injection nozzle positioned to spray a fuel into the prechamber space. An electrode arrangement may be formed within the prechamber space. The electrode arrangement may include an electrode shaft and an electrode ring. The electrode ring may circumscribe the electrode shaft to form a spark gap within the prechamber space.

In another aspect, embodiments disclosed herein relate to a combustion system which may include an engine block with a cylinder. A piston may be configured to move up and down inside a main chamber of the cylinder. An active prechamber device may be mounted to a cylinder head of the cylinder. The active prechamber device may include a prechamber housing longitudinally aligned with a main axis; a prechamber nozzle forming a cap at an end of the prechamber housing, the prechamber nozzle and prechamber housing defining a prechamber space that extends along the main axis, the prechamber nozzle having a plurality of orifices fluidly connected to the prechamber space; a fuel injector in a linear arrangement with the prechamber housing along the main axis, the fuel injector having a fuel injection nozzle positioned to spray a fuel into the prechamber space; and an electrode arrangement formed within the prechamber space, the electrode arrangement including an electrode shaft and an electrode ring, the electrode ring circumscribing the electrode shaft to form a spark gap within the prechamber space. Further, the plurality of orifices may be in fluid communication with the main chamber to inject fuel into the cylinder.

Other aspects and advantages of the invention will be apparent from the following description and the appended claims.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, shapes of the elements as drawn are not necessarily intended to convey any information regarding the actual shape of the elements and have been solely selected for ease of recognition in the drawing.

DETAILED DESCRIPTION

Figure 1A:
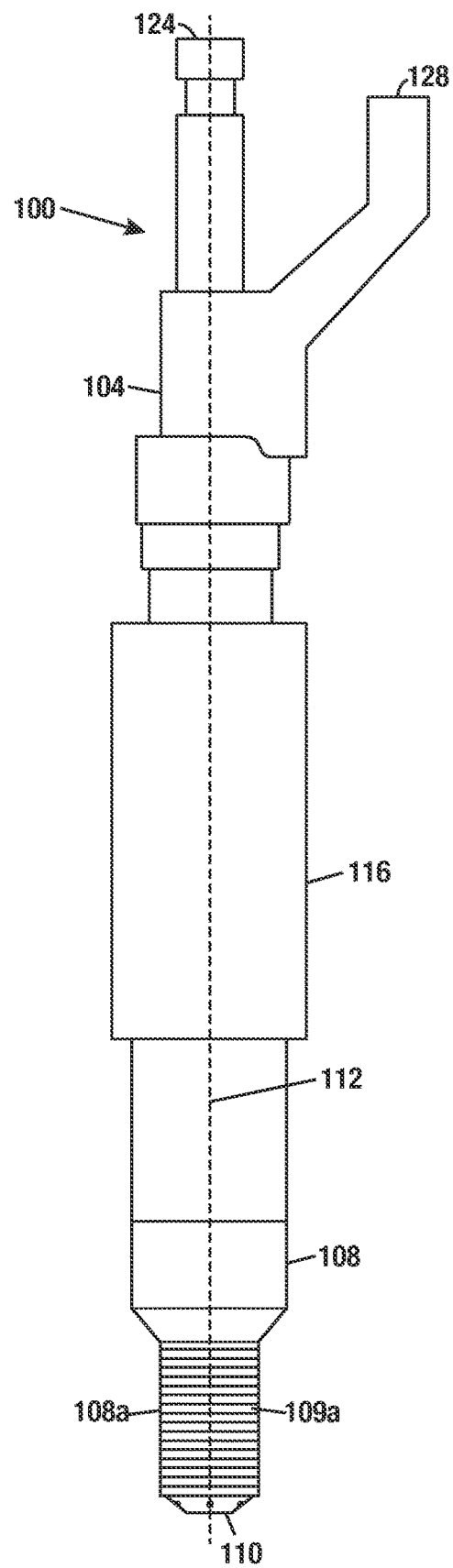
FIG. 1A is an elevated view of an active prechamber device in accordance with embodiments disclosed herein.

In the following detailed description, certain specific details are set forth to provide a thorough understanding of various disclosed implementations and embodiments. However, one skilled in the relevant art will recognize that implementations and embodiments may be practiced without one or more of these specific details, or with other methods, components, materials, and so forth. For the sake of continuity, and in the interest of conciseness, same or similar reference characters may be used for same or similar objects in multiple figures. As used herein, the term "coupled" or "coupled to" or "connected" or "connected to" "attached" or "attached to" may indicate establishing either a direct or indirect connection, and is not limited to either unless expressly referenced as such. As used herein, fluids may refer to slurries, liquids, gases, and/or mixtures thereof. It is to be further understood that the various embodiments described herein may be used in various stages of a well (land and/or offshore), such as rig site preparation, drilling, completion, abandonment etc., and in other environments, such as work-over rigs, fracking installation, well-testing installation, oil and gas production installation, without departing from the scope of the present disclosure.

The different embodiments described herein may provide an active prechamber assembly for enabling turbulent jet induced lean burn combustion in an internal combustion engine. More specifically, embodiments disclosed herein are directed to an active prechamber assembly that may include a fuel injector, a sparking element ring, and a prechamber nozzle aligned along an axis. In one or more embodiments, a prechamber space may extend along the axis and communicate with the fuel injector and the prechamber nozzle. Further, a center electrode shaft may extend into a central opening of the sparking element ring to form a spark gap at a location within the prechamber space.

Conventional industry designs typically requires a fuel injector in close proximity of a sparkplug. This packaging has limitations regarding sparkplug size that can be used. Typically, the smallest sparkplug is used which limits the durability of the sparkplug, leading to premature failures. Further, these typical designs require costly and significant redesigns of the base engine cylinder head.

Advantageously, the active prechamber assembly disclosed herein may be compact in size and shape. Moreover, because the active prechamber assembly is compact and fits in an existing cylinder head of the engine, the disclosed active prechamber assembly may require minimal modifications by way of machining or casting changes to the engine. Further, a configuration and arrangement of the active prechamber assembly provides a compact and linear design along with a better interaction of the fuel air charge in the prechamber space and the sparking element ring. Overall, the active prechamber assembly may minimize product engineering, risk associated with spark ignition, reduction of assembly time, hardware cost reduction, and weight and envelope reduction. The embodiments are described merely as examples of useful applications, which are not limited to any specific details of the embodiments herein.

Figure 1B:
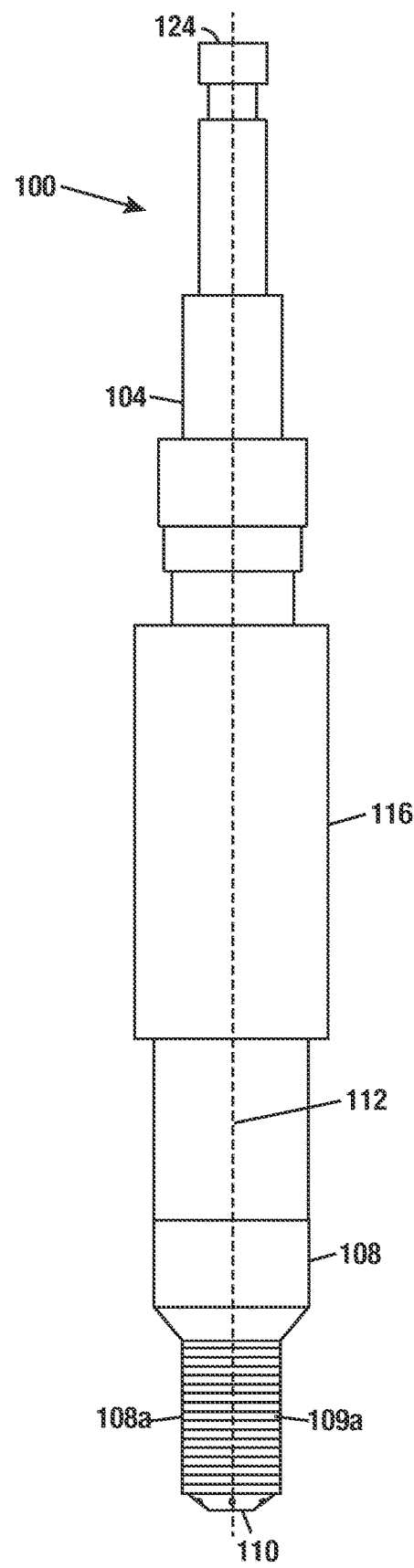
FIG. 1B is an elevated view of the active prechamber device shown in FIG. 1A from another viewpoint in accordance with embodiments disclosed herein.

Referring to FIGS. 1A and 1B, different elevated views of an active prechamber device 100 in accordance with embodiments disclosed herein are illustrated. The active prechamber device 100 may include a main axis 112. The active prechamber device 100 may have a fuel injector 104 and a prechamber housing 108 in a linear arrangement on the main axis 112. For example, the fuel injector 104 and the prechamber housing 108 may be arranged in series with a longitudinal axis of the fuel injector 104 and the prechamber housing 108 aligned with the main axis 112. In one example, the fuel injector 104 may be coupled to the prechamber housing 108 via an adapter 116.

In one or more embodiments, the active prechamber device 100 may have a prechamber nozzle 110 arranged to form a cap at an end of the prechamber housing 108. In one example, the prechamber housing 108 may have a cylindrical section 108*a* to which the prechamber nozzle 110 is attached. An external surface 109*a* of the cylindrical section 108*a* may include threads to allow the prechamber housing 108 to be installed in a cylinder head by making up a threaded connection. To allow the prechamber housing 108 to be installed in an existing cylinder head, the threads on the external surface 109*a* may be selected to match threads in an existing spark plug opening in the cylinder head. In addition, the active prechamber device 100 may include a fuel supply port 124 through which fuel can be supplied to the fuel injector 104. The fuel supply port 124 may be coaxial with the main axis 112. Further, the active prechamber device 100 may include an electrical connection port 128 through which an electrical connection may be made to provide power and controls to electrical components inside the fuel injector 104. The electrical connection port 128 may be off axis with the main axis 112.

Figure 2:
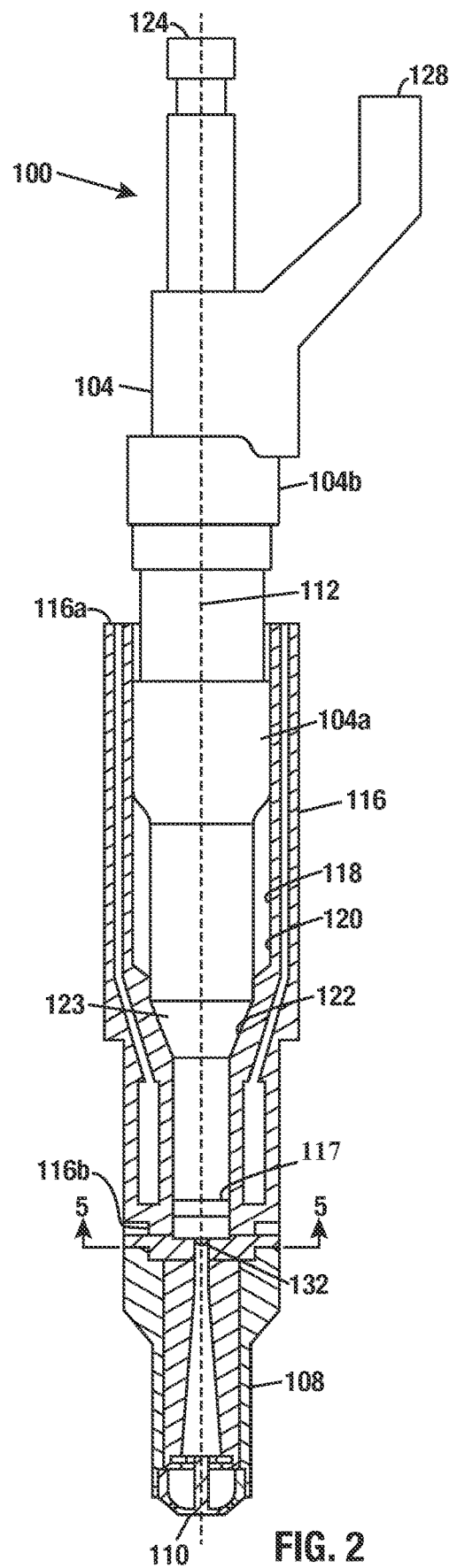
FIG. 2 is a partial cross-sectional view of the active prechamber device of FIG. 1A in accordance with embodiments disclosed herein.

Referring to FIG. 2, in one or more embodiments, FIG. 2 illustrates a partial cross-sectional view of the adapter 116 in the active prechamber device 100 of FIG. 1A. The adapter 116 may be a tubular body. In one example, the adapter body 116 may have an inner surface 118 that defines a central bore 120, which extends along main axis 112. The central bore 120 may be accessible from an upper end 116*a* of the adapter 116. A lower portion 104*a* of a fuel injector 104 may be received inside the central bore 120. The inner surface 118 of the adapter 116 may have a tapered seat 122 to engage with a tapered portion 123 of the lower portion 104*a* when the lower portion 104*a* is received inside the central bore 120. An injection nozzle 132 through which fuel is sprayed may be provided at a tip of the lower portion 104*a*. The lower portion 104*a* may be inserted into the central bore 120 to position an injection nozzle 132 proximate a lower end 116*b* of the adapter 116. It is further envisioned that a seal 117, such as a Teflon seal, may be provided on the fuel injector 104. The seal 117 may prevent gas leakages between the fuel injector 104 and the adapter 116 when the fuel injector 104 is slip fitted onto the adapter 116.

While the lower portion 104*a* is received inside the central bore 120, an upper portion 104*b* of the fuel injector 104 may extend above upper end 116*a* of the adapter 116. The upper portion 104*b* may include the fuel supply port 124 through which fuel can be supplied to the fuel injector 104 and the electrical connection port 128 through which an electrical connection can be made to provide power and controls to electrical components inside the fuel injector 104. The exact positions of the ports 124, 128 in the upper portion 104b may depend on the fuel injector design and are not limited to what is illustrated in FIG. 2. For example, the fuel supply port 124 may be at a side of the upper portion 104b rather than at the top as shown. In general, the fuel injector 104 may be any known fuel injector with an injection nozzle to spray fuel and that can be controlled to the open and closed positions, for example, by an engine control unit (ECU). In some cases, the fuel injector 104 may be solenoid actuated or piezo actuated.

In one or more embodiments, the prechamber housing 108 may be attached to the lower end 116b of the adapter 116 using any suitable method, such as a mechanical fastener. In one example, the prechamber housing 108 may be attached to the adapter 116 via screws or bolts 119. Two screws or bolts 119 may be spaced 180 degrees apart from each other to secure the prechamber housing 108 and the adapter 116.

Figure 3:
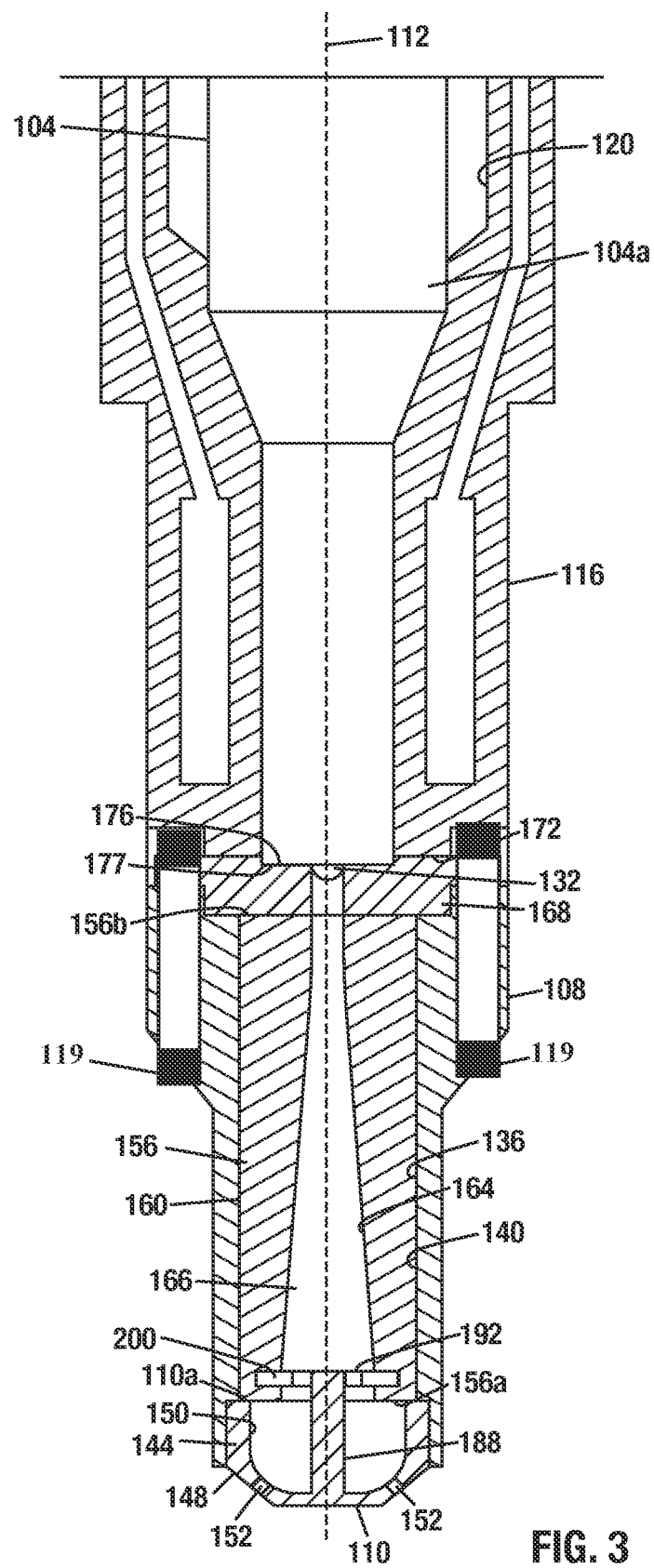
FIG. 3 is a cross-sectional view of a lower portion of the active prechamber device shown in FIG. 1A in accordance with embodiments disclosed herein.
Figure 4:
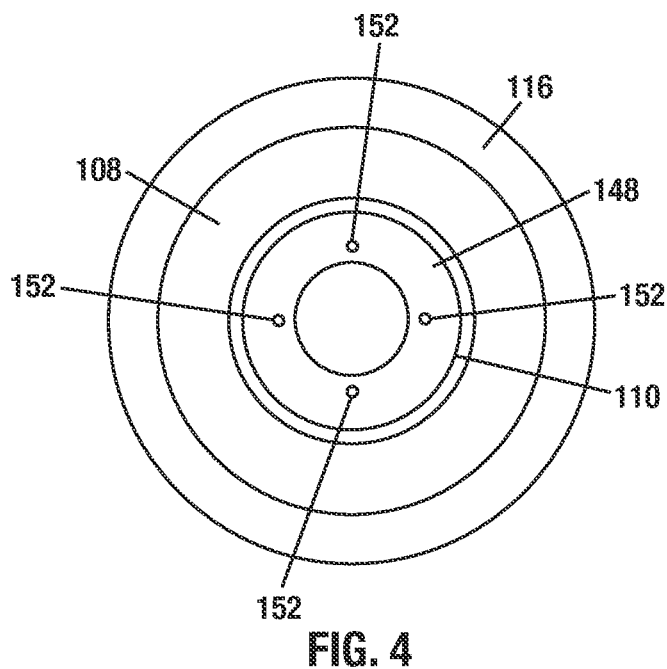
FIG. 4 is an end view of FIG. 3 showing orifices in a prechamber nozzle in accordance with embodiments disclosed herein.

Referring to FIG. 3, FIG. 3 shows a close-up view of the prechamber housing 108 of FIG. 2. The prechamber housing 108 has an inner surface 136 defining a central bore 140, which extends along the main axis 112. In one example, the central bore 140 of the prechamber housing 108 may be longitudinally aligned with the central bore 120 of the adapter 116. The prechamber nozzle 110 may be a cap that is mounted at an end of the prechamber housing 108. In one example, the prechamber nozzle 110 includes a side wall 144 and an end wall 148, which together define a chamber 150. The side wall 144 may include a threaded surface to threadedly engage a portion of the inner surface 136 of the prechamber housing 108 and thereby attach the prechamber nozzle 100 to the prechamber housing 108. The end wall 148 includes a plurality of orifices 152. As shown more clearly in FIG. 4, the plurality of orifices 152 may be arranged in a circular pattern on the end wall 148. The plurality of orifices 152 provide a communication path between an external environment of the prechamber nozzle 110 and the chamber 150 (in FIG. 3).

Returning to FIG. 3, in one or more embodiments, a dielectric tube 156 may be disposed inside the central bore 140 of the prechamber housing 108. A lower end 156a of the dielectric tube 156 may abut an upper end 110a of the prechamber nozzle 110. The dielectric tube 156 may be sized such that an outer surface 160 of the dielectric tube 156 engages the inner surface 136 of the prechamber housing 108. For example, an outer diameter of the dielectric tube 156 matches an inner diameter of the prechamber housing 108. The central bore 140 and the dielectric tube 156 may be coaxial with the prechamber housing 108.

In one or more embodiments, the dielectric tube 156 may be made of a material with good electrical insulation properties at high temperatures. In one example, the dielectric tube 156 may be made of a dielectric ceramic material such as alumina. The dielectric tube 156 may have a conical bore 164 extending along the main axis 112. For example, a diameter of the conical bore 164 may gradually increase along the main axis 112. In the example shown in FIG. 3, the diameter increases in a direction towards the prechamber nozzle 110. The conical bore 164 may be fluidly connected to the nozzle chamber 150 inside the prechamber nozzle 110. The conical bore 164 and the nozzle chamber 150 together define a prechamber space 166 that extends along the main axis 112. The conical bore 164 may have a conical angle between 20-30° and forms a divergent section. The conical bore 164 may outwardly grow a spray plume when fuel is injected prevent impingement of liquid fuel on walls of the conical section. The spray plume may be angled between 5-20°. The walls may be a ceramic material between the dielectric tube 156 and an electrical conductor (see 208 in FIG. 7) that runs along one side.

Figure 5:
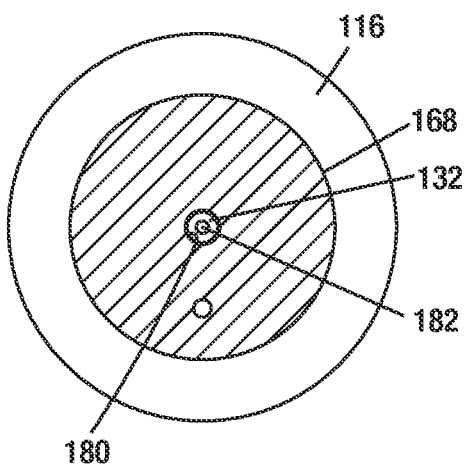
FIG. 5 is a cross-section of FIG. 2 along line 5-5 in accordance with embodiments disclosed herein.

In some embodiments, an electrical connector 168 may be disposed between a lower end face 172 of the adapter 116 and an upper end face 156b of the dielectric tube 156. The electrical connector 168 may abut both end faces 172, 156b and may be held in place by securing the adapter 116 to the prechamber housing 108. The electrical connector 168 may include a seat 176 for an end 177 of the fuel injector 104 where the injection nozzle 132 is located. The electrical connector 168 may have a central opening 180 extending from a seat 176 to the conical bore 164 of the dielectric tube 156. When the lower portion 104a of the fuel injector 104 may be received inside the central bore 120 of the adapter 116 such that the end 177 of the fuel injector 104 engages the seat 176, orifice(s) (182 in FIG. 5) in the injection nozzle 132 will be exposed to the central opening 180, allowing fuel sprayed from the injection nozzle 132 to enter into the conical bore 164 through the central opening 180.

Returning to FIG. 3, in one or more embodiments, a center electrode shaft 188 and an electrode ring 192 may be arranged to form a spark gap within the prechamber space 166 a shown by FIG. 3. The center electrode shaft 188 is carried by the prechamber nozzle 110. When the active prechamber device 100 is installed in an engine, the center electrode shaft 118 will be grounded to the engine body and provide a ground electrode. The center electrode shaft 188 extends from an end wall 148 of the prechamber nozzle 110, through the chamber 150, into an ignition zone in the conical bore 164. The ignition zone may be an area of the conical bore 164 immediately adjacent to the chamber 150. The center electrode shaft 188 is centrally located within the prechamber nozzle 110 and is axially aligned with the main axis 112. In one example, the center electrode shaft 188 may be made of a metal material such as steel or nickel. The center electrode shaft 188 may be integrally formed or otherwise attached to the end wall 148 of the prechamber nozzle 110.

Figure 6:
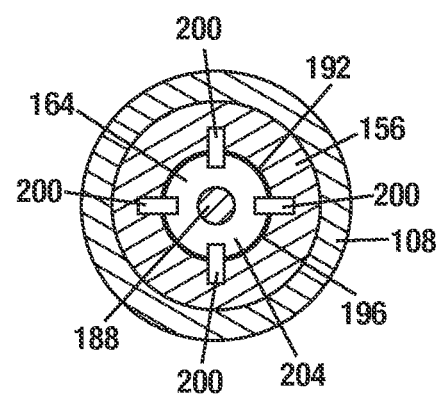
FIG. 6 is a cross-section of FIG. 7 along line 6-6 in accordance with embodiments disclosed herein.

As shown more clearly in FIG. 6, the electrode ring 192 includes a ring element 196 and a plurality of tabs 200 positioned radially on the ring element. The plurality of tabs 200 may be integrated to the electrode ring 192. For illustrative purposes, four tabs 200 are shown. However, the electrode ring 192 may have more or less than four tabs to provide a gap for a spark to jump from the electrode ring 192 to the center electrode shaft 188. A gap may be created between the plurality of tabs 200 and the center electrode shaft 188 may allow a spark to jump and crate an energy rich spark. Further, the electrode ring 192 and the plurality of tabs 200 may be encased within the dielectric tube 156. It is further envisioned that the plurality of tabs 200 may be received in radial slots in the wall of the dielectric tube 156 and project radially into a space 204 within the ring element 196. The electrode ring 192 may be made of copper or iridium or other electrode material that can withstand high temperatures.

Referring to FIGS. 3 and 6, the electrode ring 192 may be disposed around a portion of the center electrode shaft 188 extending into the conical bore 164. Spacing between the plurality of tabs 200 and the center electrode shaft 188 (spacing 204 is shown in FIG. 6) provides a spark gap. A size of the spark gap is set by a diameter of the center electrode shaft 188 or a length of the tabs 200. For example, the size of the spark gap may be between 0.05 to 0.09 mm.

Figure 7:
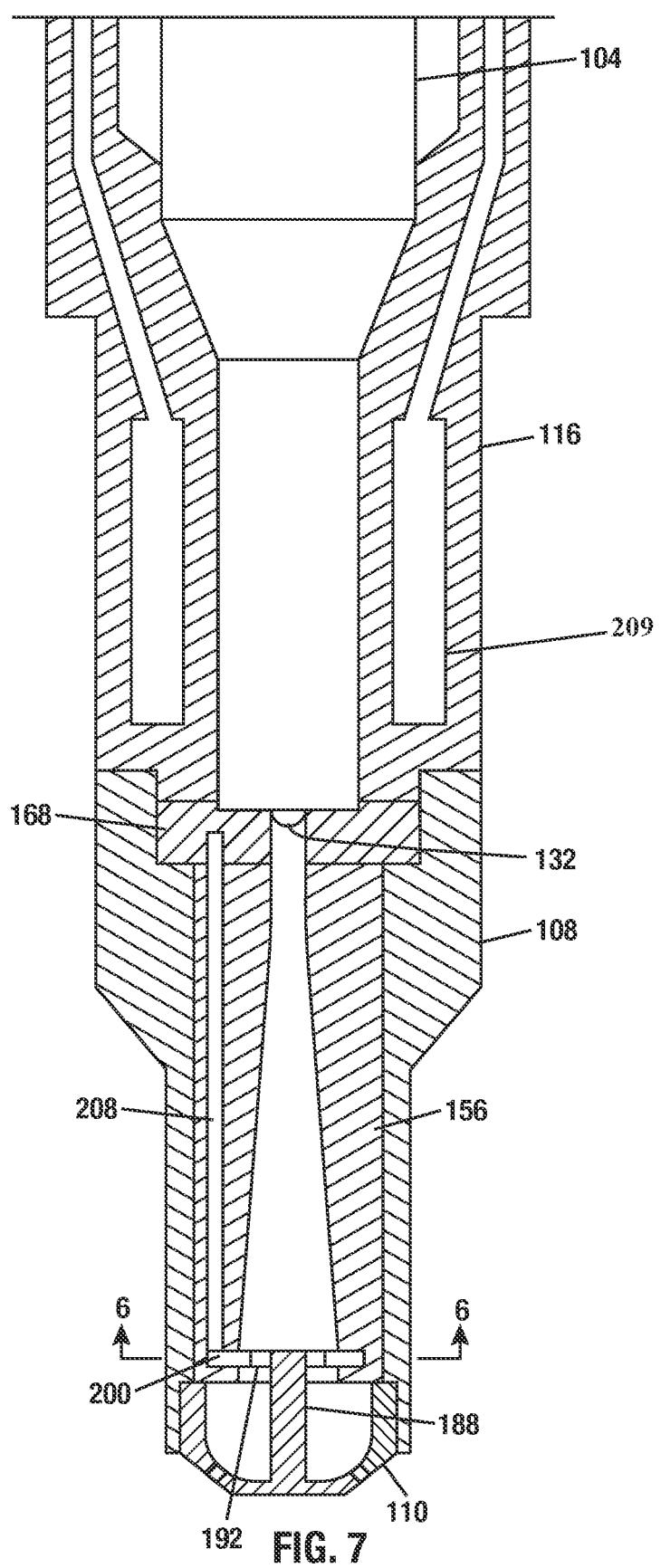
FIG. 7 is a cross-sectional view of a lower portion of the active prechamber device shown in FIG. 1B in accordance with embodiments disclosed herein.

Referring to FIG. 7, to provide voltage to the electrode ring 192, one tab of the plurality of tabs 200 of the electrode ring 192 may be electrically coupled to the electrical connector 168. For example, an electrical conductor 208 embedded in a wall of the dielectric tube 156 may form an electrical path between one tab of the plurality of tabs 200 of the electrode ring 192 and the electrical connector 168. The electrical conductor 208 may be, for example, a copper wire. Additionally, an insulated conductor wire (not shown) may connect to the electrical connector 208, via the electrical connector 168, and run through the adapter 116 to connect outside to an electrical wire power source. Further, the insulated conductor wire may be provided in a groove (not shown) in the body of the adapter 116. The groove may cutoff a coolant jacket 209 in the adapter 116.

In one or more embodiments, the electrode ring 192 will normally require a high voltage to generate a spark, e.g., a voltage on the order of 30,000 volts. To allow delivery of this high voltage to the electrode ring 192 without the voltage leaking to the center electrode shaft 188 through the prechamber housing 108 and the prechamber nozzle 110, the dielectric tube 156 needs to be made of a material with good insulation properties at high temperatures, such as alumina. When the center electrode shaft 188 is connected to ground, the high voltage applied to the electrode ring 192 will result in a discharge arc in the spark gap between the electrode ring 192 and the center electrode shaft 188.

Figure 8:
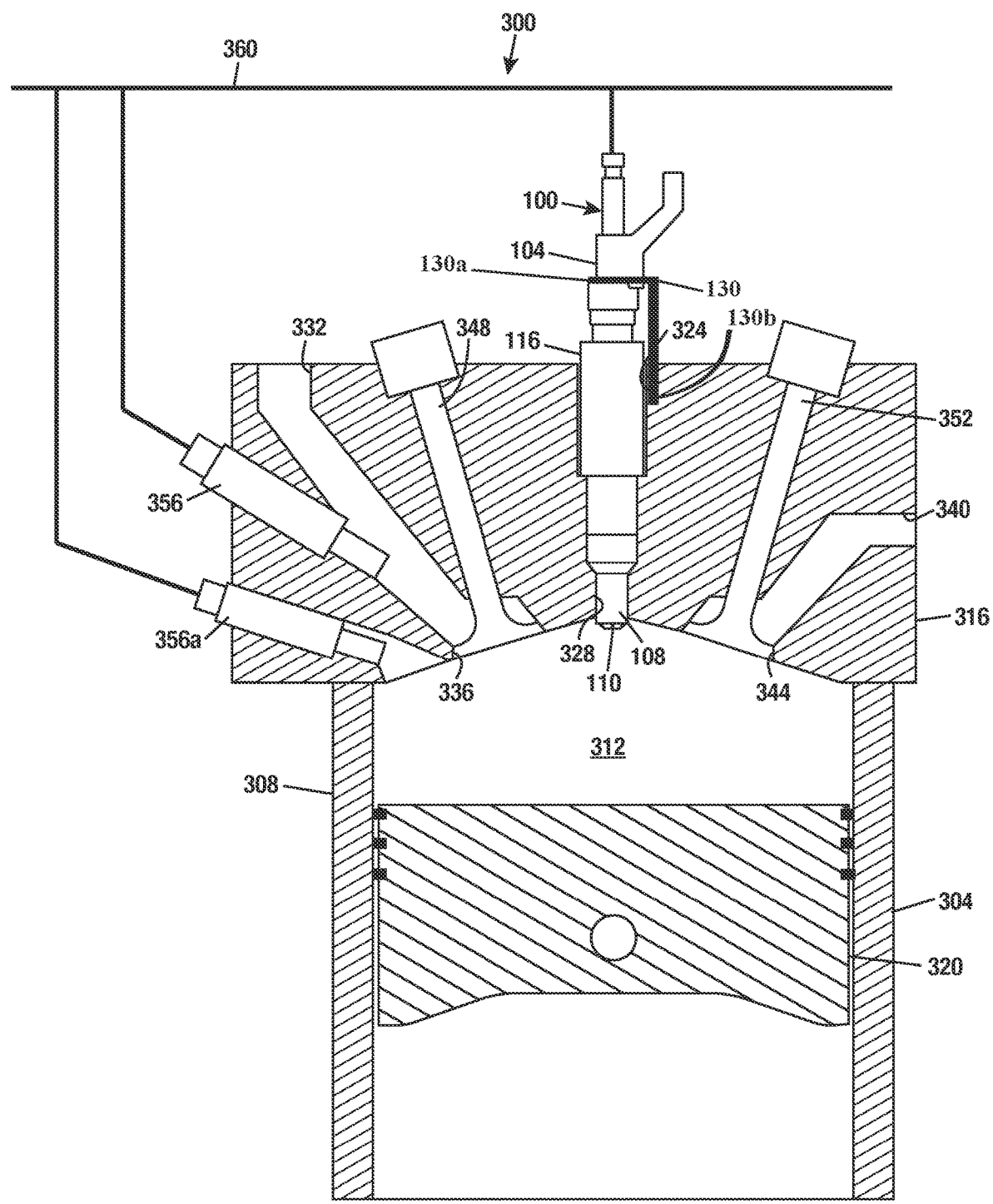
FIG. 8 is a schematic diagram showing the active prechamber device of FIGS. 1A-7 mounted in a cylinder head in accordance with embodiments disclosed herein.

Now referring to FIG. 8, in one or more embodiments, a combustion system 300 including a cylinder 304 formed within an engine body or engine block 308 is illustrated. For illustration purposes, only a portion of the engine block 308 is shown, and only one cylinder 304 in the engine block 308 is shown. The engine block 308 may have several cylinders 304. The cylinder 304 includes a main chamber 312. A cylinder head 316 is mounted at a top of the cylinder 304 and forms an upper end of the main chamber 312. A piston 320 is arranged inside the cylinder 304 and forms a lower end of the main chamber 312. The piston 320 moves up and down inside the cylinder 304 during an engine cycle, and the volume of the main chamber 312 changes with the position of the piston 320. Normally, the piston 320 is connected to a crankshaft (not shown) by a connecting rod (not shown). The crankshaft will convert the reciprocating motion of the piston 320 into rotary motion, as is well known in the art.

In one or more embodiments, the cylinder head 316 has a tunnel 324 terminating in a threaded bore 328. In an existing cylinder head design, the threaded bore 328 may be an existing spark plug opening with threads. The active prechamber device 100, as described in FIGS. 1A-7, may be mounted to the cylinder head 316. For example, a bracket 130 may have a first end 130a clamped on the fuel injector 104 of the active prechamber device 100 and a second end 130b mounted on the cylinder head 316. The bracket 130 may have an internal profile matching an outer profile of the active prechamber device 100 such that the active prechamber device 100 is snap fitted into the bracket. Further, the first end 130a may include an opening to receive the fuel supply port (see 124 in FIGS. 1A-2). It is further envisioned that the prechamber housing 108 may be threaded into the threaded bore 328.

In some embodiments, installation of the active prechamber device 100 in the cylinder head 316 includes forming the nozzle assembly, which includes the prechamber housing 108, the prechamber nozzle 110, and the structures inside the prechamber housing 108 as previously described. The nozzle assembly is inserted into the tunnel 324, and a threaded connection is made between the prechamber housing 108 and the threaded bore 328, which would place the prechamber nozzle 110 in a position where the orifices in the prechamber nozzle 110 are exposed and in fluid communication to the main chamber 312. The adapter 116 is then attached to the prechamber housing 108, followed by mounting the fuel injector 104 in the adapter 116.

The cylinder head 316 may include an intake passage 332 terminating in an intake port 336. The cylinder head 316 may include an exhaust passage 340 terminating in an exhaust port 344. An intake valve 348 is arranged to control opening and closing of an intake port 336. When the intake port 336 is open, air can be drawn into the main chamber 312 from the intake passage 332. Although not shown, the intake passage 332 is connected to a source of air in a conventional manner. The air in the intake passage 332 may be ambient air or a mixture of ambient air and recirculated exhaust gases. An exhaust valve 352 is arranged to control opening and closing of the exhaust port 344. When the exhaust port 344 is open, exhaust gases can be pushed out of the main chamber 312 into the exhaust passage 340. Opening and closing of valves 348, 352 may be controlled by an engine control unit (not shown).

The engine control unit may be a control system having a computing system coupled to a controller (e.g., a processor) to operate the various components of the combustion system 300. The control system may include instructions or commands to operate the various components of the combustion system 300 automatically. For example, the engine control unit may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. It is further envisioned that software instructions in a form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. For example, the software instructions may correspond to computer readable program code that, when executed by a processor(s), is configured to perform one or more embodiments of the disclosure.

In some embodiments, a fuel injector 356 may be positioned to inject fuel into the intake passage 332. The air flowing through the intake passage 332 will carry the fuel to the intake port 336, delivering a fuel-air mixture to the main chamber 312. Alternatively, or in addition to the fuel injector 356, a second fuel injector 356a may be positioned to directly inject fuel into the main chamber 312. The second fuel injector 356a may directly inject the fuel through a port in cylinder head as shown or through a port (not shown) in a side of the cylinder 304. Inside the main chamber 312, the fuel injected directly into the main chamber 312 will mix with the air from the intake port 336. Alternatively, both injection of fuel through the intake port 336 and direct injection of fuel into the main chamber 312 may be used. The fuel injector 356 is connected to a fuel line 360, which is in communication with a fuel supply. The fuel injector 104 of the active prechamber device 100 may be connected to the same fuel line 360. The engine control unit may control opening and closing of the fuel injectors to deliver fuel into the main chamber 312 and the prechamber space within the prechamber device 100 at desired times during an engine cycle.

While the method and apparatus have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. An active prechamber device comprising:
   a prechamber housing longitudinally aligned with a main axis;
   a prechamber nozzle forming a cap at an end of the prechamber housing, the prechamber nozzle and prechamber housing defining a prechamber space that extends along the main axis, the prechamber nozzle having a plurality of orifices fluidly connected to the prechamber space;
   a fuel injector in a linear arrangement with the prechamber housing along the main axis, the fuel injector having a fuel injection nozzle positioned to spray a fuel into the prechamber space; and
   an electrode arrangement formed within the prechamber space, the electrode arrangement comprising an electrode shaft and an electrode ring, the electrode ring circumscribing the electrode shaft to form a spark gap within the prechamber space.

2. The active prechamber device of claim 1, further comprising an adapter positioned to releasably couple the prechamber housing to the fuel injector.

3. The active prechamber device of claim 2, wherein the adapter comprises a central bore extending along the main axis, and wherein a portion of the fuel injector including the fuel injection nozzle is disposed inside the central bore.

4. The active prechamber device of claim 3, wherein the prechamber housing comprises a central bore, and further comprising a dielectric tube disposed within the central bore of the prechamber housing.

5. The active prechamber device of claim 4, wherein the electrode ring is coupled to the dielectric tube, and wherein the electrode shaft is coupled to the prechamber nozzle.

6. The active prechamber device of claim 5, wherein the electrode shaft is longitudinally aligned with the main axis.

7. The active prechamber device of claim 5, further comprising an electrical connector disposed between the fuel injector and the dielectric tube and an electrical conductor embedded in a wall of the dielectric tube to form an electrical path between the electrical connector and the electrode ring.

8. The active prechamber device of claim 7, wherein the dielectric tube includes a conical bore extending along the main axis, and wherein the prechamber space is defined in part within the conical bore.

9. The active prechamber device of claim 8, wherein the electrical connector includes a central opening that is fluidly connected to the conical bore of the dielectric tube.

10. The active prechamber device of claim 9, wherein the injection nozzle is positioned to spray the fuel into the conical bore through the central opening in the electrical connector.

11. The active prechamber device of claim 5, wherein the electrode ring comprises a ring element with a plurality of tabs radially positioned on the ring element, and wherein the electrode ring is coupled to the dielectric tube by inserting the plurality of tabs in a plurality of slots in the dielectric tube.

12. The active prechamber device of claim 11, wherein the spark gap is a gap between the plurality of tabs and the electrode shaft.

13. The active prechamber device of claim 1, wherein the prechamber housing includes an external threaded surface to threadedly engage a bore in an engine cylinder head.

14. The active prechamber device of claim 2, further comprising a seal between the fuel injector and the adapter.

15. A combustion system comprising:
    an engine block with a cylinder;
    a piston configured to move up and down inside a main chamber of the cylinder; and
    an active prechamber device mounted to a cylinder head of the cylinder, the active prechamber device comprising:
    a prechamber housing longitudinally aligned with a main axis;
    a prechamber nozzle forming a cap at an end of the prechamber housing, the prechamber nozzle and prechamber housing defining a prechamber space that extends along the main axis, the prechamber nozzle having a plurality of orifices fluidly connected to the prechamber space;
    a fuel injector in a linear arrangement with the prechamber housing along the main axis, the fuel injector having a fuel injection nozzle positioned to spray a fuel into the prechamber space; and
    an electrode arrangement formed within the prechamber space, the electrode arrangement comprising an electrode shaft and an electrode ring, the electrode ring circumscribing the electrode shaft to form a spark gap within the prechamber space,
    wherein the plurality of orifices is in fluid communication with the main chamber to inject fuel into the cylinder.

16. The combustion system of claim 15, wherein the cylinder head comprises a tunnel with a threaded bore, wherein threads of the prechamber housing are threaded into the threaded bore.

17. The combustion system of claim 15, further comprising a second fuel injector positioned in an intake passage of the cylinder head configured to inject a fuel or fuel/air mixture into the main chamber.

18. The combustion system of claim 17, wherein the active prechamber device and the second fuel injector are connected to a fuel line.

19. The combustion system of claim 17, further comprising an engine control unit configured to control an opening and closing of the fuel injector and the second fuel injector to deliver fuel into the main chamber and the prechamber space.

20. The combustion system of claim 15, further comprising a bracket having a first end clamped on the fuel injector and a second end mounted on the cylinder head.

* * * * *